Figure 1:
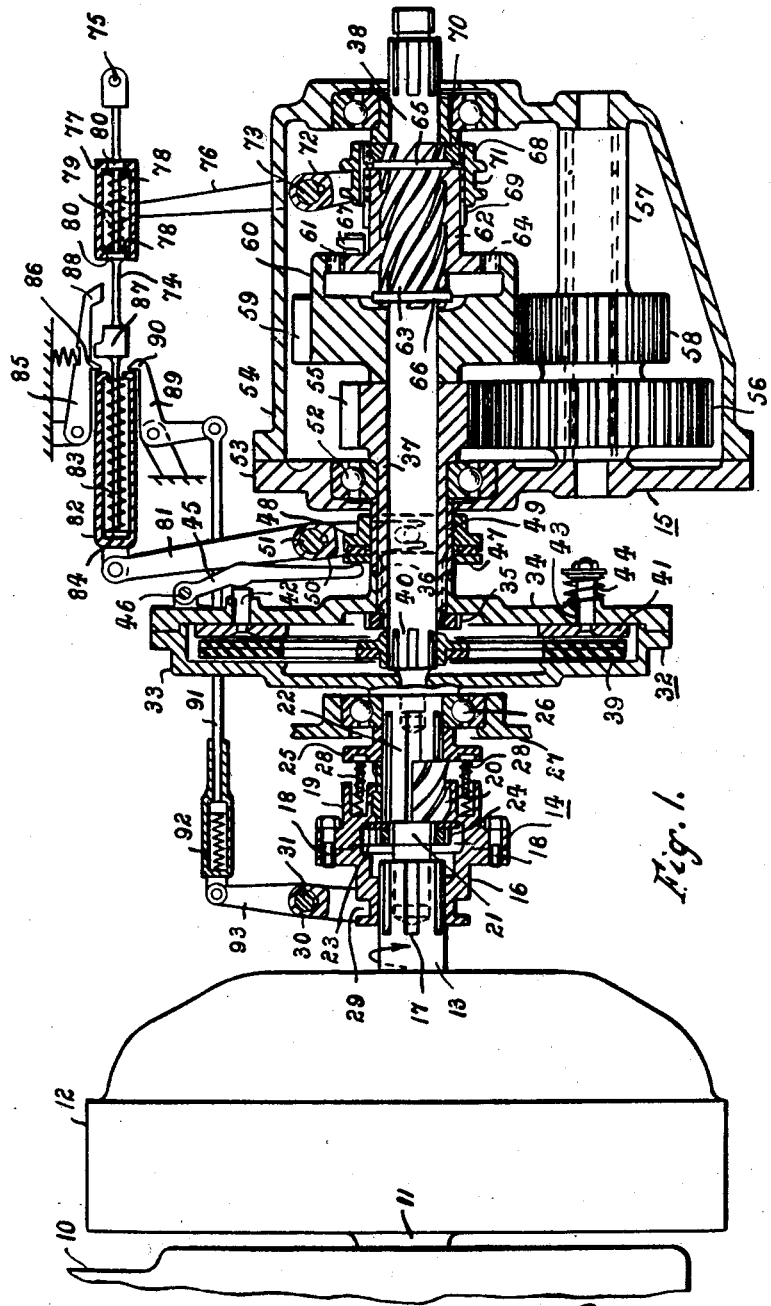

May 23, 1950 H. SINCLAIR 2,508,776
MULTIRATIO GEARING
Filed Aug. 30, 1946 2 Sheets-Sheet 1

Inventor
Harold Sinclair
Dean, Fairbank & Hussh
Attorneys

May 23, 1950 — H. SINCLAIR — 2,508,776
MULTIRATIO GEARING
Filed Aug. 30, 1946 — 2 Sheets-Sheet 2
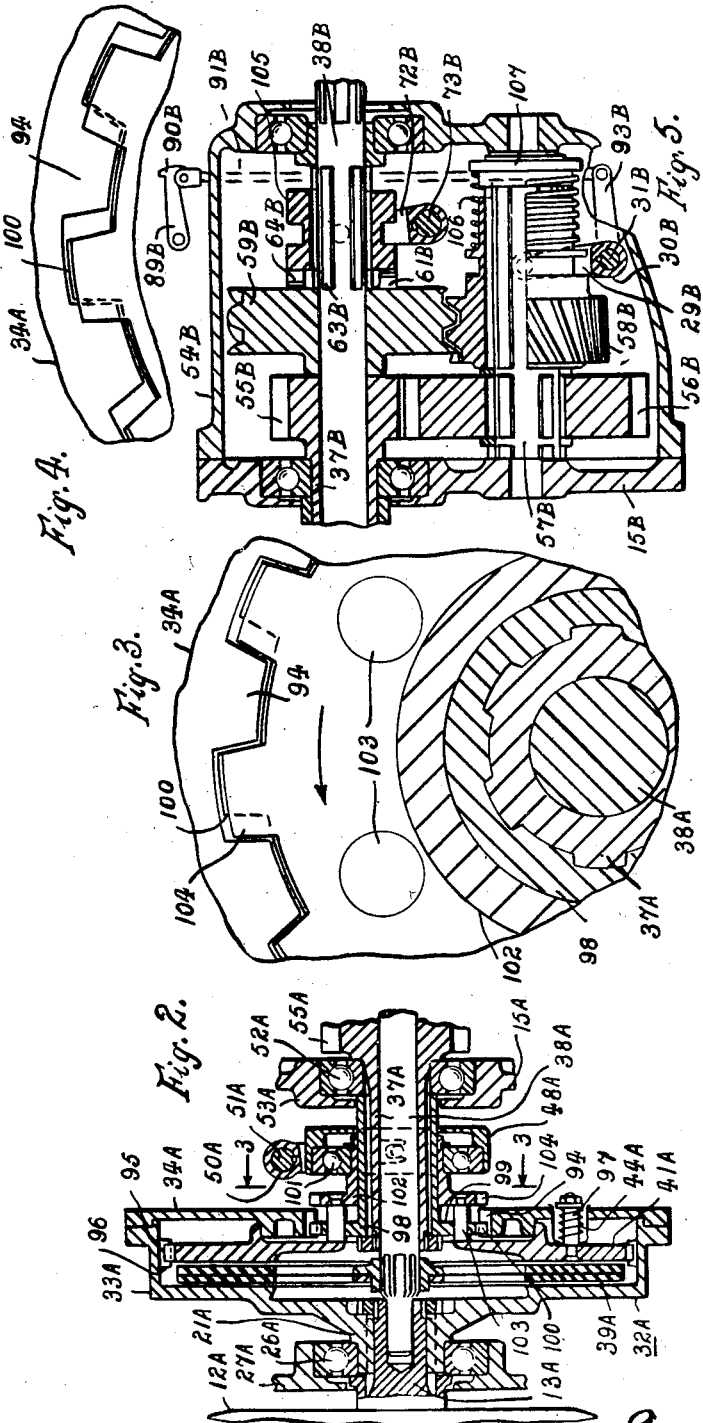

Patented May 23, 1950

2,508,776

UNITED STATES PATENT OFFICE 2,508,776

MULTIRATIO GEARING

Harold Sinclair, London, England

Application August 30, 1946, Serial No. 693,894
In Great Britain September 5, 1945

12 Claims. (Cl. 74—337)

This invention relates to multi-ratio gearing suitable for use in applications where the load driven through the gearing is apt, under certain circumstances, to reverse the sense of the torque in the gearing. Thus, for example, in the main power transmission gearing of both wheeled and track motor vehicles, of hauling and conveying plant and of the draw-works of well-drilling rigs, gravity or other agencies may at times impose on the change-speed gearing an over-running torque in place of the normal driving torque.

The invention furthermore relates to multi-ratio gearing of the kind in which driving torque can be maintained between the input and output shafts of the gearing during the operation of changing from a lower- to a higher-speed ratio. Such gearing essentially includes two alternative power paths yielding respectively low-speed and high-speed ratios. The high-speed power path includes a slippable coupling, while the low-speed power path includes a coupling which is adapted to disengage automatically or to be disengaged on the reversal of the torque applied to it. The change to a higher-speed ratio is effected by engaging the said slippable coupling in the high-speed power path, which has the effect of reversing the sense of the torque in the low-speed power path while maintaining driving torque on the output shaft; the coupling in the low-speed path thereupon disengages, while the slippable coupling progressively forces the speeds of the input and output shafts of the gearing into the ratio of the higher speed.

The disengagement of the low-speed coupling may be automatic and due to the inherent characteristics of the coupling itself, e.g. the coupling may be a conventional free-wheel, or a Legge synchro-coupling as described in United States patent specification No. 1,862,188. Alternatively, the disengagement may be due to a bias imposed on a shifting element of the coupling by a preselective or servo-operated control system, e. g. the coupling may be a jaw clutch of conventional design, as disclosed in United States patent specification No. 2,011,734; as a further alternative, the coupling may be a synchro-self-shifting coupling provided with controllable locking means, as described in United States patent specification No. 2,245,017.

When the coupling in the lower-speed path is of the self-disengaging type, e. g. a free-wheel or a synchro-coupling, in order to prevent the gearing from free-wheeling when operating on the lower-speed ratio, which is undesirable when it is required to make use of the braking effect obtainable from the motor, it is usual to provide this coupling with controllable locking means which operate to prevent its disengagement on reversal of torque. Where such controllable locking means are provided, it is essential that they shall be unlocked as a preliminary to making the change to the higher-speed ratio. If they are not unlocked before the slippable coupling in the higher-speed power path takes up the drive sufficiently to cause a reversed torque through the coupling in the lower-speed path, the gearing will drive on two speeds at the same time, causing an overload to be imposed on the gear trains and the locking means and preventing the change of speed ratio from taking place, the slip in the slippage coupling will be sustained for an undue period, with risk of damage to this coupling, and the load may be brought to a standstill in a disagreeably rapid manner. The existence of any substantial overrunning torque in the low-speed power path imposes on such controllable locking means a load which prevents them from being disengaged, as is necessary to effect the gear changing operation.

It is normal practice in the application of this kind of gearing to a vehicle, for example, to effect the change of gear with the throttle of the engine open so that the load is being driven by the engine and is not overrunning; hence there is no difficulty in unlocking the said controllable locking means. If a gear change is attempted when the load is overrunning the engine, the locking means are not free to disengage and engagement of the slippable coupling during the overrunning condition aggravates this difficulty. A particular example of this arises when a vehicle with a governed engine is running down a steep gradient at maximum engine speed on the lower-speed ratio of a gearing of the kind specified; it is then impossible to accelerate the engine further so as to re-establish driving torque through the lower speed coupling and thus to permit the locking means to unlock. If the gear-selecting mechanism is of the preselective type or is servo-operated or is of any other type in which the locking means are indirectly or resiliently actuated, it is possible for the locking means to be retained in the locked position by overrunning torque although the gear-selecting mechanism has been operated in such a way as would normally precede or cause a change to the higher-speed ratio, with the consequence that the above described condition of attempting to drive on two speeds at once occurs.

Similarly, when the coupling in the lower-speed power path is of the jaw-clutch type associated with shifting means capable of biasing it towards disengagement so that it will disenage at the instant when the torque load on it changes from the driving sense to the overrunning sense, circumstances may arise where a gear shift is attempted when the jaw clutch is already carrying substantial overrunning torque, with the result that this torque will operate to prevent its disengagement, and the above described difficulty arises.

An object of this invention is to overcome this difficulty.

According to this invention, a multi-ratio gearing, adapted for use in circumstances where the sense of the torque load through the gearing is apt to be reversed during running, and of the kind having a higher-speed power path including a controllable slippable coupling, and a lower-speed power path including a coupling which is capable of disengagement on reversal of torque applied to it and which is provided with control means for rendering it capable of transmitting overrunning torque, is characterised by torque-responsive means adapted to discriminate between driving and overrunning torques passing through the gearing and to operate to prevent engagement of said slippable coupling while there is substantial torque in the overrunning sense. The word "substantial" here means large enough to give rise to the difficulty hereinbefore referred to. The improved gearing may include biasing means which are so associated with the torque-responsive means as to cause them to prevent engagement of the slippable coupling unless the torque is in the driving sense.

The torque-responsive means may include an axially movable member coupled to two torque-transmitting elements of the gearing by splines of different helix angles, detent means for preventing engagement of said slippable coupling, and an operative connection between said movable member and said detent means for rendering the detent means operative in response to the existence of torque in the overrunning sense on said movable member. One of the sets of splines may be straight, representing the limiting case where the helix angle is zero.

Alternatively the torque-responsive means may include a connection providing back-lash between two torque-transmitting elements of the gearing, and detent means, operating in response to relative displacement of said elements permitted by said back-lash on reversal of torque through them, for preventing engagement of said slippable coupling. Thus the slippable coupling may be of the mechanically actuated type, the connection that provides the back-lash being incorporated in the slippable coupling and co-operating directly with the actuating mechanism of the coupling.

As a further alternative, the gearing may include two co-operating helical gear-wheels one of which is capable of limited axial movement, and detent means, operating in response to such axial movement, for preventing engagement of said slippable coupling.

Embodiments of the invention will be described by way of example and with reference to the accompanying diagrammatic drawings, in which:

Fig. 1 is a part-sectional side elevation of a power-transmission system including one form of the improved multi-ratio gearing, Fig. 2 is a sectional side elevation of an alternative torque-discriminating mechanism suitable for substitution in the system shown in Fig. 1, Fig. 3 is a section of a detail taken on the line 3—3 in Fig. 2 and on a larger scale, Fig. 4 shows parts appearing in Fig. 3 in a different position, and Fig. 5 is a sectional side elevation of a further alternative form of gearing.

The system shown in Fig. 1 includes an internal-combustion motor 10 the crank shaft 11 of which is fixed to the impeller part of a hydraulic turbo coupling 12. The runner shaft 13 of this coupling is connected by a torque-discriminating coupling 14 to a two-speed lay-shaft gearing 15.

The coupling 14 has an internally-splined collar 16 slidable on straight splines 17 on the shaft 13 and fixed by screws 18 to an internally-splined collar 19 slidable on right-handed helical splines on the exterior of a bushing 20. The input member of the gearing 15 is a shaft 21 having at its front end a pilot bearing in the shaft 13 and provided with splines 22 engaging internal splines on the bushing 20. Helical displacement of the collar 19 on the bushing 20 and the shaft 21 is limited by a washer 23 held by a nut 24 engaged on a screw-threaded part of the shaft 21, and by a flanged member 25 engaged on the splines 22. The rear end of the shaft 21 is carried by a bearing 26 housed in a fixed member 27. Spring plungers 28 having their heads located in recesses in the member 25 and their tails accommodated in holes in the collar 19 urge the collars 16 and 19 to the front, i. e. towards the position in which they appear in Fig. 1. A groove 29 in the collar 16 co-operates with a yoke lever 30 fixed to a cross shaft 31.

The slip coupling of the gearing, which is denoted as a whole by 32, is of the single-disk friction type having a driving body 33 rigid with the shaft 21. A cover plate 34 is fixed to the body 33 and has an internally-splined hub held by a nut 35 on splines 36 on the front end of a hollow shaft 37. An output shaft 38 passes through the shaft 37, its front end being piloted in the shaft 21. A driven disk 39 of the clutch 32 is mounted on splines 40 on the output shaft 38. A pressure plate 41 is carried by pins 42 and 43 slidable in guides in the cover plate 34. The pins 43 are associated with compression springs such as 44 which bias the clutch towards disengagement. The pins 42 co-operate with radial levers, such as 45, the outer ends of which are pivoted at 46 to the cover plate 34. The inner ends of the levers 46 lie in front of a thrust ring 47 engaged by a striking ring 48 which is slidable on a spacing tube 49 surrounding the shaft 37. The striking ring 48 co-operates with a yoke lever 50 fixed to a cross shaft 51.

The shaft 37, which is carried by a bearing 52 in an end cover 53 of a gear case 54, is rigid with a pinion 55 meshing with a gear wheel 56 fast on a live lay-shaft 57. A pinion 58 fast on the lay-shaft 57 meshes with a gear wheel 59 rotatable on the output shaft 38 and provided with a tubular extension 60 having internal jaw-clutch teeth 61. A nut 62 is slidably engaged with right-handed helical splines 63 on the shaft 38 and is provided with jaw-clutch teeth 64 which mesh with the teeth 61 when the nut is in the rear-most position against a snap ring 65. The nut can move forward against a snap ring 66 and thereby disengage the teeth 61 from the teeth 64. Pawls such as 67 are mounted on the nut with their noses directed clockwise as viewed from the back end of the system. The pawl noses are slightly in advance of the flanks of adjacent teeth 64 on the nut, and when the nut is in its forward position the pawls co-operate with the teeth 61. An internally splined locking sleeve 68 is slidable on splines 69 on the nut and engageable with an externally splined locking ring 70 fast on the shaft 38. The locking splines are so arranged that the locking sleeve 68 can engage the ring 70 only when the nut is in the rear position in which the jaw-clutch teeth 61 and 64 are meshed together and that when the locking sleeve is so engaged the nut 62 is prevented from moving on the shaft 38. The locking sleeve is provided with a striking groove 71 co-operating with a yoke lever 72 fast on a cross shaft 73.

The gear-shifting control mechanism includes a selector rod 74 coupled at 75 to any desired actuating means. A lever 76 fast on the cross shaft 73 is connected to the rod 74 by a preloaded spring coupling capable of yielding in both directions. This coupling consists of a tube 77 pivotally connected to the lever 76 and having flanges at its ends cooperating with washers 78 slidable on the rod 74 and urged by a compression spring 79 against flanges 80 on the rod 74.

The front end of the rod 74 is connected to a lever 81, fast on the cross shaft 51, by a preloaded extendible spring link consisting of a tube 82 pivotally connected to the lever 81. A compression spring 83 is retained between a flange on the rear end of the tube 82 and a head 84 on the front end of the rod 74. A first detent lever 85 carried by a fixed pivot has a tooth 86 adapted to prevent rearward movement of the tube 82 until the lever 85 is raised by a cam 87 on the rod 74 engaging a tail 88 on the lever 85.

A second detent lever 89 carried by a fixed pivot has a tooth 90 adapted also to prevent rearward movement of the tube 82. The lever 89 is coupled by a rod 91 and a preloaded compressible spring link 92 to a lever 93 fast on the cross shaft 31.

The system is shown in Fig. 1 with the low-speed gear engaged and with overrunning torque acting through it, the direction of rotation being denoted by the arrow around the shaft 13. Under this condition the torque load on the nut 62 of the synchro-coupling in the low-speed power path tends to screw the nut forwards along the shaft 38, and this tendency is resisted by the locking sleeve 68, the splines of which are accordingly loaded. If an attempt is now made to shift to the high-speed gear by moving the selector 74 to the rear, the torque load on the splines of the locking sleeve 68 prevents this sleeve from moving forwards to its unlocked position and the coupling spring 79 yields. The cam 87 will have raised the detent lever 85 out of engagement with the coupling tube 82, but, since the detent lever 89 is still engaged with the tube 82, the high-speed clutch 32 is locked in its disengaged condition and the coupling spring 83 remains fully compressed.

When there is driving torque on the system, the collars 16 and 19 will be thereby slid to the rear, and this will disengage the detent lever 89 from the coupling tube 82. If now the selector rod 74 is moved to the rear to effect a change from low to high gear, the locking sleeve 68 is moved forwards, since its splines are unloaded, and, when it is disengaged from the locking ring 70, the cam 87 lifts the detent lever 85 and allows the spring 83 to act to engage the clutch 32. This clutch directly couples the shaft 21 and 38 and the synchro-coupling nut is screwed forwards, by the overrunning of the wheel 59 by the shaft 38, until the teeth 64 disengage from the teeth 61.

To effect the change from high to low gear, the selector rod 74 is moved forwards to disengage the clutch 32 and to bias the locking sleeve 68 towards its engaged position, and the splines in this sleeve abut against the ends of the splines on the locking ring 70. The motor is now accelerated, and as soon as the gear wheel 59 begins to overrun the shaft 38, one of the pawls 67 picks up a tooth 61 and causes the nut 62 to be screwed rearwards on the shaft 38 and the nut teeth 64 to be meshed smoothly with the teeth 61. As these teeth become fully engaged, the splines on the locking sleeve 68 slip round the ends of the splines on the locking ring 70 and the spring 79 operates to lock the synchro-coupling in the low-gear condition.

The compression spring link 92 accommodates the movement of the collars 16 and 19 due to reversal of torque after high speed has been engaged.

The system shown in Fig. 2 differs from that shown in Fig. 1 only in that the torque-discriminating device is incorporated in the high-speed clutch, instead of being in front of it, and in that, in consequence, the control elements 30, 31, 93, 92, 91, 89, 90 of Fig. 1 are dispensed with. Parts in Fig. 2 identical with or corresponding to parts in Fig. 1 are denoted by the same reference numerals, but with the suffix A.

The runner shaft 13A of the turbo-coupling is rigidly coupled to the input shaft 21A of the gearing. The cover plate 34A of the high-speed clutch 32A has a central aperture surrounded by teeth 94 projecting radially inwards. The pressure plate 41A has driving teeth 95 slidably engaged with teeth 96 on the body, and it is associated with compression springs, such as 97, which bias it towards disengagement. A sleeve 98, splined to the hollow shaft 37A, has a flange 99 provided with teeth 100 which are in constant mesh with the teeth 94, but which are narrower in the circumferential direction than the teeth 94 so that there is a limited back-lash between the input shaft 21A and the hollow shaft 37A.

The striking ring 48A is coupled by a thrust bearing 101 to a striking sleeve 102 provided with pins 103 which are a close sliding fit in holes in the flange 99 and which engage the pressure plate 41A. The striking sleeve 102 is provided with teeth 104 which are adapted to mesh without back-lash with the teeth 94. The trailing flanks of the teeth 104 are aligned with the trailing flanks of the teeth 100; the leading flanks of the teeth 104 are consequently in advance of the leading flanks of the teeth 100.

In operation, so long as driving torque is being transmitted through the low-speed train, i. e. through the parts 21A, 33A, 34A, 94, 100, 98, 37A, and 55A, the leading flanks of the teeth 94 abut against the trailing flanks of the teeth 100, so that the teeth 104 are aligned for meshing with the teeth 94 (Fig. 3). As a result, the striking sleeve 102 can be slid forwards to engage the high-speed clutch 32A. The presence of the slight back-lash is unobjectionable since any tendency to rattle is prevented by the damping effect of the turbo-coupling 12A.

If, however, there is overrunning torque on the low-speed train, the trailing flanks of the teeth 94 abut against the leading flanks of the teeth 100, so that the teeth 104 are no longer aligned for meshing with the teeth 94 (Fig. 4) and the clutch 32A is therefore positively locked out of engagement since the striking sleeve 102 is prevented from being slid forwards.

The gearing shown in Fig. 5 is designed to replace, in the system shown in Fig. 1, both the gearing 15 and the torque-discriminating coupling 14. Parts in Fig. 5 identical with or corresponding to parts in Fig. 1 are denoted by the same reference numerals, but with the suffix B.

The gearing 15B in Fig. 5 differs from the gearing 15 in Fig. 1 in that a jaw-clutch having a sliding dog 105 replaces the synchro-coupling in the low-speed train and in that the lay-shaft pinion 58B and the gear wheel 59B are of the helical-tooth type, the pinion 58B having left-handed teeth and being slidably splined to the lay-shaft 57B. A compression spring 106 biases this pinion towards the front. The yoke lever 30B co-operates with the circumferential groove 29B in a hub of the pinion 58B, the lever 30B being fast on the cross shaft 31B, which is coupled by the lever 93B and the rod 91B to the detent lever 89B. The jaw-clutch teeth 61B and 64B have oblique end faces arranged in known manner to prevent engagement of the jaw clutch while the sliding dog 105 is rotating forwards faster than the wheel 59B.

In operation, when the low-speed path 37B, 55B, 56B, 57B, 58B, 59B, 61B, 64B, 105, 38B is carrying overrunning torque, the parts are in the position shown in Fig. 5, and the detent lever 89B operates, as described with reference to Fig. 1, to prevent engagement of the high-speed clutch. When driving torque is applied to the low-speed path, the helical tooth reaction causes the pinion 58B to slide to the rear until it abuts against a stop collar 107 fast on the lay-shaft, and the detent lever 89B is consequently moved into its inoperative position. Since the torque-discriminating device is in the low-speed path, which cannot be loaded when the high-speed clutch is engaged, there is no need for a spring connection in the rod 91B.

I claim:

1. A multi-ratio gearing for use in circumstances where the sense of the torque load through the gearing is apt to be reversed during running, the gearing having a driving member, a driven member, means providing a high-speed power path between said members and including a slippable coupling, means providing a low-speed power path between said members and including a coupling for establishing a low-speed ratio, at least one of said means including toothed wheel gearing, and said low-speed coupling resisting disengagement when transmitting substantial torque and being disengageable on reversal of torque applied to it, a control member operable for engaging said slippable coupling to establish a high-speed ratio, control means operable for putting said low-speed coupling into and out of condition to transmit overruning torque, torque-responsive means which are located in a part of said gearing that is loaded when the low-speed path is transmitting torque and which are capable of discriminating between driving and overrunning torques, and interlocking means actuated by said torque-responsive means and co-operating with said control member to prevent engagement of said slippable coupling while there is substantial torque in the overrunning sense on said low-speed coupling.

2. A gearing as claimed in claim 1, including biasing means which are so associated with said torque-responsive means as to cause them to prevent engagement of said slippable coupling unless the torque is in the driving sense.

3. A multi-ratio gearing for use in circumstances where the sense of the torque load through the gearing is apt to be reversed during running, the gearing having a driving member, a driven member, means providing a high-speed power path between said members and including a slippable coupling, means providing a low-speed power path between said members and including a coupling for establishing a low-speed ratio and of the type that disengages automatically in response to reversal of torque applied to it, locking means operable for putting said low-speed coupling into and out of condition to transmit overrunning torque, said low-speed coupling resisting disengagement when transmitting substantial overruning torque, a control member operable for engaging said slippable coupling to establish a high-speed ratio, torque-responsive means which are located in a part of said gearing that is loaded when the low-speed path is transmitting torque and which are capable of discriminating between driving and overrunning torques, and interlocking means actuated by said torque-responsive means and co-operating with said control member to prevent engagement of said slippable coupling while there is substantial torque in the overrunning sense on said low-speed coupling.

4. A multi-ratio gearing for use in circumstances where the sense of the torque load through the gearing is apt to be reversed during running, the gearing having a driving member, a driven member, means providing a high-speed power path between said members and including a slippable coupling, means providing a low-speed power path between said members and including a jaw clutch, shifting means operable to bias said jaw clutch towards disengagement, a control member operable for engaging said slippable coupling to establish a high-speed ratio, torque-responsive means which are located in a part of said gearing that is loaded when the low-speed path is transmitting torque and which are capable of discriminating between driving and overrunning torques, and interlocking means actuated by said torque-responsive means and co-operating with said control member to prevent engagement of said slippable coupling while there is substantial torque in the overrunning sense on said jaw clutch.

5. A multi-ratio gearing for use in circumstances where the sense of the torque load through the gearing is apt to be reversed during running, the gearing having a driving member, a driven member, means providing a high-speed power path between said members and including a slippable coupling, means providing a low-speed power path between said members and including a coupling for establishing a low-speed ratio, said low-speed coupling resisting disengagement when transmitting substantial torque and being disengageable on reversal of torque applied to it, a control member operable for engaging said slippable coupling to establish a high-speed ratio, control means operable for putting said low-speed coupling into and out of condition to transmit overrunning torque, torque-responsive means including an axially movable member coupling by splines of different helix angles respectively two torque-transmitting elements of the gearing that are loaded when the low-speed path is transmitting torque, detent means for preventing operation of said control member to engage the slippable coupling, and an operative connection between said axially movable member and said detent means for rendering the detent means operative in response to the existence of torque in the overrunning sense on said axially movable member.

6. A gearing as claimed in claim 5, wherein said axially movable member is coupled to one of said torque-transmitting elements by straight splines.

7. A multi-ratio gearing for use in circumstances where the sense of the torque load through the gearing is apt to be reversed during running, the gearing having a driving member, a driven member, means providing a high-speed power path between said members and including a slippable coupling, means providing a low-speed power path between said members and including a coupling for establishing a low-speed ratio, said low-speed coupling resisting disengagement when transmitting substantial torque and being disengageable upon reversal of torque applied to it, a control member operable for engaging said slippable coupling to establish a high-speed ratio, control means operable for putting said low-speed coupling into and out of condition to transmit over-running torque, a connection providing back-lash between two torque-transmitting elements of the gearing that are loaded when the low-speed path is transmitting torque, and blocking means co-operating with said control member and said connection in response to relative displacement of said elements permitted by said back-lash on reversal of torque through them from the driving to the overrunning sense to prevent engagement of said slippable coupling.

8. A gearing as claimed in claim 7, and comprising a mechanical connection between said control member and said slippable coupling, wherein the driving part of said slippable coupling constitutes one of said torque transmitting elements, and said blocking means comprise co-operating parts of said connection and one of said torque-transmitting elements.

9. A multi-ratio gearing for use in circumstances where the sense of the torque load through the gearing is apt to be reversed during running, the gearing having a driving member, a driven member, means providing a high-speed power plate between said members and including a slippable coupling, means providing a low-speed power path between said members and including a coupling for establishing a low-speed ratio, and two co-operating helical gear wheels one of which is capable of limited axial movement, said low-speed coupling resisting disengagement when transmitting substantial torque and being disengageable on reversal of torque applied to it, a control member operable for engaging said slippable coupling to establish a high-speed ratio, control means operable for putting said low-speed coupling into and out of condition to transmit overrunning torque and detent means co-operating with said control member in response to axial movement of said one gear wheel on reversal of the torque from the driving to the overrunning sense to prevent engagement of said slippable coupling.

10. A multi-ratio gearing for use in circumstances where the sense of the torque load through the gearing is apt to be reversed during running, the gearing having a driving member, a driven member, means providing a high-speed power path between said members and including a slippable coupling, means providing a low-speed power path between said members and including a coupling having two relatively displaceable members provided with interengageable torque-transmitting projections and control means operable for displacing said members to disengage said projections, a control member operable to engage said slippable coupling, torque-responsive means capable of discriminating between driving torque and overrunning torque exceeding a predetermined value applied through said low-speed path, and interlocking means actuated by said torque-responsive means and co-operating with said control member for preventing engagement of said slippable coupling while said low-speed path carries substantial overrunning torque.

11. A multi-ratio gearing including a first main shaft, a second main shaft co-axial with said first shaft, a hollow shaft surrounding part of said second shaft, a controllable slippable coupling having co-operating driving and driven elements, one of which is in direct driving connection with said first and hollow shafts and the other of which is in direct driving connection with said second shaft, a reduction gear train in series with a positive coupling having preselector control means for connecting said hollow shaft and said second shaft together, and control means operable for engaging said slippable coupling while said positive coupling is preselected for disengagement.

12. A multi-ratio gearing including a first main shaft, a second main shaft co-axial with said first shaft, a hollow shaft surrounding part of said second shaft, a controllable friction clutch having a body forming a direct driving connection between said first and hollow shafts and a friction element which co-operates with said body and which is in direct driving connection with said second shaft, a reduction gear train in series with a controllable positive coupling for connecting said hollow shaft and said second shaft together, control means operatively connected with said friction clutch and said positive coupling for simultaneously biasing said friction clutch towards engagement and preselecting said positive coupling for disengagement, and means responsive to overruning torque in said gear train for locking said friction clutch in its disengaged condition.

HAROLD SINCLAIR.

REFERENCES CITED

The following references are of record in the file of this patent:

UNITED STATES PATENTS

| Number | Name | Date |
|---|---|---|
| 2,042,356 | Nardone | May 26, 1936 |
| 2,107,422 | Moross | Feb. 8, 1938 |
| 2,205,832 | Henriod | June 25, 1940 |

FOREIGN PATENTS

| Number | Country | Date |
|---|---|---|
| 765,778 | France | Mar. 31, 1934 |